United States Patent
Miyata

(10) Patent No.: US 7,684,081 B2
(45) Date of Patent: Mar. 23, 2010

(54) COLOR IMAGE PROCESSING APPARATUS AND PROGRAM TO SPEED UP MULTI-VALUED CONVERSION PROCESSING USING DITHER MATRIXES AND COUNTERS

(75) Inventor: Yuji Miyata, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 936 days.

(21) Appl. No.: 11/477,432

(22) Filed: Jun. 30, 2006

(65) Prior Publication Data

US 2009/0097045 A1    Apr. 16, 2009

(30) Foreign Application Priority Data

Jun. 30, 2005    (JP) .............................. 2005-192176

(51) Int. Cl.
*H04N 1/52* (2006.01)

(52) U.S. Cl. ........................................ 358/1.9; 358/535

(58) Field of Classification Search .................. 358/1.9, 358/3.06, 3.13, 3.23, 534–536; 382/270; 345/596–599

See application file for complete search history.

(56) References Cited

U.S. PATENT DOCUMENTS

| | | | | |
|---|---|---|---|---|
| 5,166,809 | A | * | 11/1992 | Surbrook .................... 358/3.23 |
| 5,642,439 | A | * | 6/1997 | Sato et al. .................. 358/3.23 |
| 6,519,056 | B1 | | 2/2003 | Hattori |

FOREIGN PATENT DOCUMENTS

| | | |
|---|---|---|
| JP | 61-294967 | 12/1986 |
| JP | 7-262349 | 10/1995 |
| JP | 7-262349 A | 10/1995 |
| JP | 11-252370 | 9/1999 |
| JP | 2000-22953 | 1/2000 |
| JP | 2000-059625 | * 2/2000 |
| JP | 2000-59625 | 2/2000 |
| JP | 2000-341522 | 12/2000 |

OTHER PUBLICATIONS

Japanese Office Action issued in Japanese Patent Application No. JP 2005-192176, dated Jul. 3, 2007.

* cited by examiner

*Primary Examiner*—Scott A Rogers
(74) *Attorney, Agent, or Firm*—Baker Botts, LLP.

(57) ABSTRACT

An image processing apparatus comprises: a N-valued conversion unit that converts color component values of plural colors comprised in pixels constituting input image data into N-valued values in a unit of color based on threshold values of the plural colors; a dither matrix storage unit that stores dither matrixes in which one dither pattern or one kind of dither pattern is repeated in a unit of dither pattern; a counter that holds a value specifying a readout position of a row of each dither matrix; and a readout unit that reads out the threshold value of each color used from plural kinds of dither matrixes based on the values from the counter, wherein the number of threshold values constituting a row of the plural kinds of dither matrixes is a common multiple of the number of threshold values constituting a row of the plural kinds of dither patterns.

9 Claims, 12 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0x00001000 | 247 | 198 | 142 | 109 | 61 | 25 | 15 | 48 | 90 | 121 | 154 | 227 | 247 | 198 | 142 | 109 |
| 0x00001010 | 61 | 25 | 15 | 48 | 90 | 121 | 154 | 227 | 247 | 198 | 142 | 109 | 61 | 25 | 15 | 48 |
| 0x00001020 | 90 | 121 | 154 | 227 | 236 | 189 | 135 | 104 | 58 | 24 | 14 | 46 | 86 | 115 | 146 | 217 |
| 0x00001030 | 236 | 189 | 135 | 104 | 58 | 24 | 14 | 46 | 86 | 115 | 146 | 217 | 86 | 115 | 146 | 217 |
| 0x00001040 | 58 | 24 | 14 | 46 | 146 | 217 | | | | | | | 236 | 189 | 135 | 104 |

14b DITHER MATRIX MEMORY

FIG. 4

| DITHER MATRIX | HEAD ADDRESS | PERIOD | NUMBER OF ROWS |
|---|---|---|---|
| C DITHER MATRIX | 0x00001000 | 36 | 4 |
| M DITHER MATRIX | 0x00002000 | 36 | 9 |
| Y DITHER MATRIX | 0x00003000 | 36 | 12 |
| K DITHER MATRIX | 0x00004000 | 36 | 6 |

14c DITHER DATA MEMORY

| DITHER MATRIX | HEAD ADDRESS | PERIOD | NUMBER OF ROWS |
|---|---|---|---|
| C DITHER MATRIX | 0x00001000 | 28 | 4 |
| M DITHER MATRIX | 0x00002000 | 18 | 9 |
| Y DITHER MATRIX | 0x00003000 | 28 | 12 |
| K DITHER MATRIX | 0x00004000 | 18 | 18 |

14c DITHER MATRIX MEMORY

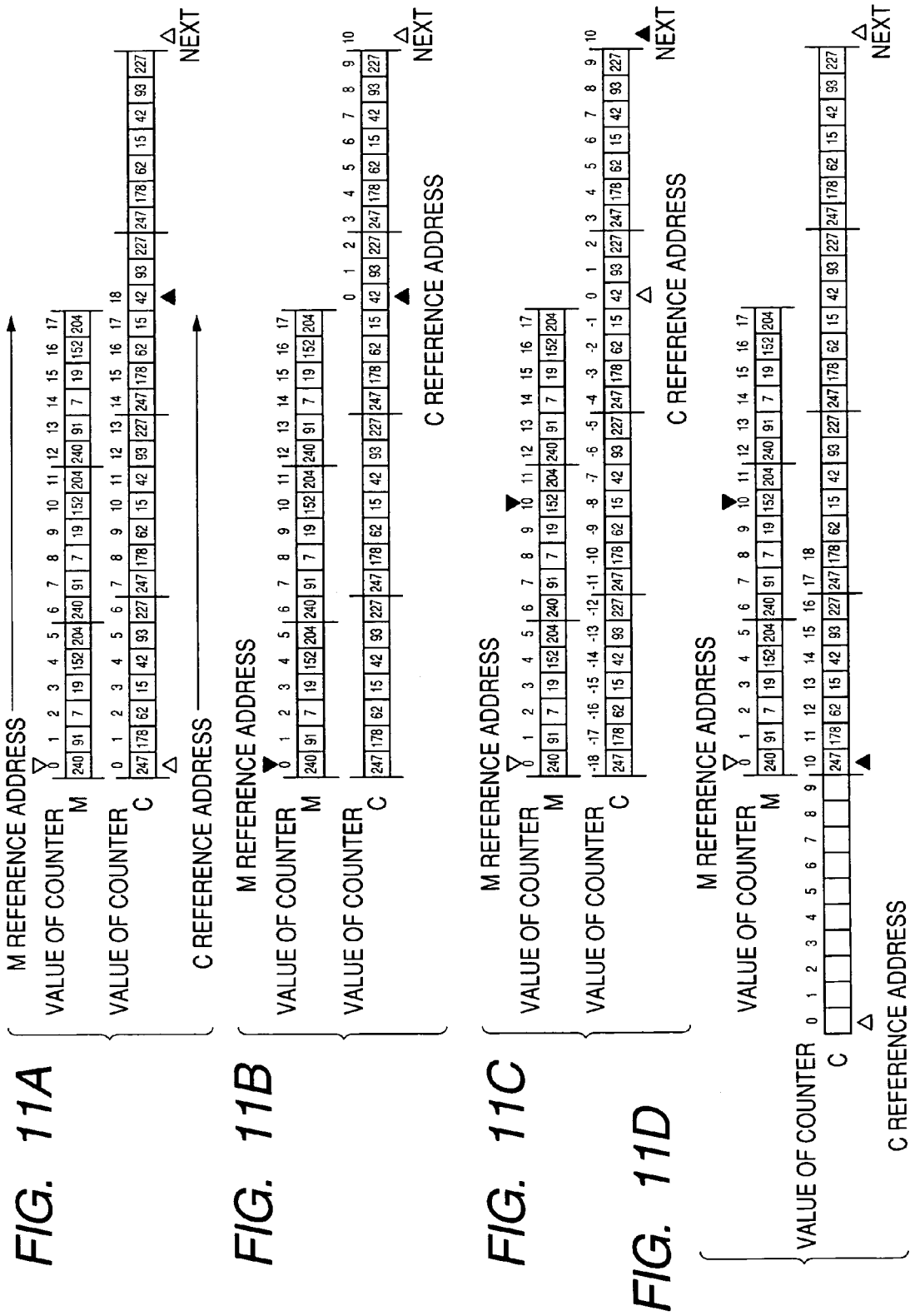

FIG. 12A
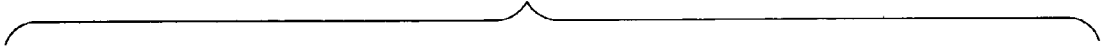
FIG. 12B
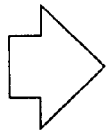
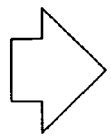

COLOR IMAGE PROCESSING APPARATUS AND PROGRAM TO SPEED UP MULTI-VALUED CONVERSION PROCESSING USING DITHER MATRIXES AND COUNTERS

CROSS-REFERENCE TO THE RELATED APPLICATION(S)

This application is based upon and claims a priority from prior Japanese Patent Application No. 2005-192176 filed on Jun. 30, 2005, the entire contents of which are incorporated herein by reference.

TECHNICAL FIELD

Aspects of the present invention relate to an image processing apparatus and an image processing program.

BACKGROUND

Colors displayed by a display apparatus comprise color components of red, green, and blue. This is called an RGB format, the title of which is obtained by collecting initial letters of the color components. On the contrary, colors printed by a printer comprise mainly color components of cyan, magenta, yellow, and black. This is called a CMYK format, the title of which is obtained by collecting initial letters of the color components. In the RGB format of the display apparatus, the brightness of the respective colors comprises 256 gray scales and the concentration of the respective colors is expressed by the gray scales. On the contrary, in the CMYK format of the printer, the brightness of the respective colors comprises 2 gray scales of existence and non-existence of a toner of the corresponding color component and the concentration of the respective colors is expressed by the amount of toner. That is, the colors of the display apparatus are expressed in a multi-valued RGB format and the output of the printer is expressed in a two-valued CMYK format.

When the colors displayed by the display apparatus are printed by the printer, the colors expressed in the multi-valued RGB format should be converted into the two-valued CMYK format. In this case, generally, the multi-valued RGB format is not converted directly into the two-valued CMYK format, but through a procedure of multi-valued RGB→multi-valued CMYK→two-valued CMYK.

There is known a method of converting the multi-valued CMYK data into the two-valued CMYK data by the use of a dither pattern. In this method, the dither pattern is prepared in advance, the multi-valued data to be converted are compared with the dither pattern, a value of the multi-valued data is converted into 1 when the value is greater than or equal to a threshold value written in the dither pattern, and a value of the multi-valued data is converted into 0 when the value is less than the threshold value. FIG. 12A illustrates one example of a 4×4 dither pattern. By performing the conversion by the use of the dither pattern shown in FIG. 12A, the multi-valued data in the left side of FIG. 12B are converted into the two-valued data in the right side of FIG. 12B.

Practically, when the multi-valued data of pixels of a row of image data are converted into two-valued data, the threshold values of a row of the dither pattern are used. That is, the values of the pixels of a row of the image data are read out for every pixel, the threshold values of a row of the dither pattern are sequentially read out from the front end (the left end in FIG. 12A), and then the read-out values are compared with each other, thereby performing the two-valued conversion process. When the threshold value of the tail in the corresponding line of the dither pattern is read out, the threshold value of the head in the same line is read out again. That is, a readout position of a threshold value of a row of the dither pattern periodically varies. Accordingly, a periodically varying value is generated by a counter, and the readout position of a row of the dither pattern is generated on the basis of the value of the counter, as disclosed in JP-A-7-262349.

SUMMARY

However, dither patterns of different sizes may be used for the color components of CMYK. The reason is that since different angles are often set for the dither patterns in order to avoid interference between the colors, the horizontal sizes of the dither patterns are inevitably different. Accordingly, when it is practically intended to convert the multi-valued CMYK image into the two-valued CMYK image, a lot of counters should be prepared because the periods of the dither patterns of CMYK are different.

The counters perform a variety of control processes such as a comparison process, a count-up process, and a substitution process. The number of processes of each counter is not large, but the two-valued conversion process should be performed on all the data of an image to be printed. Accordingly, when it is intended to print an image on an A4 sheet with a resolution of 600 dpi, the number of points to be converted into two-valued data is increased to about 32,000,000 points. Since it is necessary to perform the two-valued conversion process to all the CMYK colors, about 128,000,000 processes should be performed by the counters. As a result, slight increase in the number of processes causes great decrease in speed.

Aspects of the present invention provide an image processing apparatus and an image processing program that can speed up an N-value process.

According to an aspect of the present invention, there is provided an image processing apparatus comprising: a N-valued conversion unit that converts color component values of plural colors comprised in pixels constituting input image data into N-valued (where N is an integer greater than or equal to 2) values in a unit of color based on threshold values of the plural colors; a dither matrix storage unit that stores dither matrixes in which one dither pattern or one kind of dither pattern is repeated in a unit of dither pattern; a counter that holds a value specifying a readout position of a row of each dither matrix stored in the dither matrix storage unit; and a readout unit that reads out the threshold value of each color used for the N-valued conversion unit from plural kinds of dither matrixes stored in the dither matrix storage unit based on the values from the counter, wherein the number of threshold values constituting a row of the plural kinds of dither matrixes stored in the dither matrix storage unit is a common multiple of the number of threshold values constituting a row of the plural kinds of dither patterns.

According to another aspect of the present invention, there is provided a computer program product for enabling a computer to comprise an image processing function, comprising: software instructions for enabling the computer to perform predetermined operations; and a computer readable medium bearing the software instructions, wherein: the computer comprises: a dither matrix storage unit that stores dither matrixes in which one dither pattern or one kind of dither pattern is repeated in a unit of dither pattern; and a counter that holds a value specifying a readout position of a row of each dither matrix stored in the dither matrix storage unit; the predetermined operations comprises: converting color component values of plural colors comprised in pixels constituting input image data into N-valued (where N is an integer greater than or equal to 2) values in a unit of color based on threshold values; and reading out the threshold value of each color used for the converting from plural kinds of dither matrixes stored in the dither matrix storage unit based on the values from the counter; and the number of threshold values constituting a row of the plural kinds of dither matrixes stored in the dither matrix storage unit is a common multiple of the number of threshold values constituting a row of the plural kinds of dither patterns.

According to the aspects, the number of threshold values constituting a row of the plural kinds of dither matrixes stored in the dither matrix storage unit is a common multiple of the number of threshold values constituting a row of the plural kinds of dither patterns. That is, the plural kinds of dither matrixes comprise the same number of threshold values constituting a row. Accordingly, even when the numbers of threshold values constituting a row of the plural kinds of dither patterns are different, a common counter can be used for holding the values specifying the readout position of a row of the plural kinds of dither matrix. Therefore, in comparison with the case that the counters are provided for the plural kinds of dither matrixes, respectively, it is possible to reduce the number of counters and to reduce the number of processes necessary for controlling the counters as a whole. As a result, it is possible to increase the speed of the N-valued conversion process. Specifically, when the number of pixels to be processed is large, a slight increase in speed of the N-valued conversion process of one time can greatly enhance the speed of the N-valued conversion process as a whole.

According to another aspect of the present invention, there is provided an image processing apparatus comprising: a N-valued conversion unit that converts color component values of plural colors comprised in pixels constituting input image data into N-valued values in a unit of color based on threshold values of plural colors; a dither matrix storage unit that stores one of an n dither matrix in which the number of threshold values constituting a row is n (where n is an integer) and an m dither matrix in which the number of threshold values constituting a row is m (where m is an integer) in a unit of dither pattern, each dither matrix comprising such a configuration that one dither pattern or one kind of dither pattern is repeated; a counter that holds a value specifying a readout position of a row of the n dither matrix and the m dither matrix stored in the dither matrix storage unit; a reference value storage unit that stores reference values specifying the reference positions of the n dither matrix and the m dither matrix stored in the dither matrix storage unit; a readout unit that reads out the threshold values of the colors used for the N-valued conversion unit from the n dither matrix and the m dither matrix stored in the dither matrix storage unit based on values obtained by adding the value of the counter to the reference values of the dither matrixes stored in the reference value storage unit, and the readout unit that reads out the threshold values from the head of a row of the n thither matrix when the value of the counter is an, initial value; a counter updating unit that adds a predetermined value to the value of the counter in response to reading out the threshold values from the n dither matrix and the m dither matrix by the readout unit, and counter updating unit that returns the value of the counter to the initial value in response to reading out the threshold values of a row from the n dither matrix; and a n adding unit that adds n to the reference value of the m dither matrix stored in the reference value storage unit in response to returning the value of the counter to the initial value by the counter updating unit.

According to another aspect of the present invention, there is provided a computer program product for enabling a computer to comprise an image processing function, comprising: software instructions for enabling the computer to perform predetermined operations; and a computer readable medium bearing the software instructions, wherein: the computer comprises: a dither matrix storage unit that stores one of an n dither matrix in which number of threshold values constituting a row is n (where n is an integer) and an m dither matrix in which number of threshold values constituting a row is m (where m is an integer) in a unit of dither pattern, each dither matrix comprising such a configuration that one dither pattern or one kind of dither pattern is repeated; a counter that holds a value specifying a readout position of a row of then dither matrix and them dither matrix stored in the dither matrix storage unit; a reference value storage unit that stores reference values specifying the reference positions of the n dither matrix and the m dither matrix stored in the dither matrix storage unit; the predetermined operations comprises: converting color component values of plural colors comprised in pixels constituting input image data into N-valued values in a unit of color based on threshold values; reading out the threshold values of the colors used for the converting from the n dither matrix and the m dither matrix stored in the dither matrix storage unit based on values obtained by adding the value of the counter to the reference values of the dither matrixes stored in the reference value storage unit; reading out the threshold values from the head of a row of the n thither matrix when the value of the counter is an initial value; adding a predetermined value to the value of the counter in response to reading out the threshold values from the n dither matrix and the m dither matrix by the reading-out; returning the value of the counter to the initial value in response to reading out the threshold values of a row from the n dither matrix; and adding n to the reference value of the m dither matrix stored in the reference value storage unit in response to returning the value of the counter to the initial value.

According to the aspects, the threshold values of the colors used for the N-valued converting are read out from the n dither matrix and the m dither matrix stored in the dither matrix storage unit, on the basis of the values obtained by adding the value of the counter to the reference values of the n dither matrix and the m dither matrix stored in the reference value storage unit.

Here, when the threshold values of a row have been read out from the n dither matrix (that is, the tail threshold value of the row is read out), the value of the counter is returned to the initial value by the counter updating. Accordingly, the threshold values are read out again from the head of a row of the n dither matrix. Therefore, it is possible to read out the threshold values with a predetermined period from the n dither matrix.

On the other hand, when the value of the counter is returned to the initial value by the counter updating, n is added to the reference value of the m dither matrix stored in the reference value storage unit. As a result, the position of the n-th threshold value from the head of a row of the m dither matrix is the readout position. That is, even when the value of the counter is returned to the initial value, the readout position of the m dither matrix is not returned to the head.

Therefore, it is possible to read out the threshold values from the dither matrixes, without providing the counters for the n dither matrix and the m dither matrix, respectively. That is, since the counter can be shared by the n dither matrix and the m dither matrix, it is possible to reduce the number of counters and to reduce the number of processes necessary for controlling the counters as a whole. As a result, it is possible to increase the speed of the N-valued conversion process. Specifically, when the number of pixels to be processed is large, a slight increase in speed of the N-valued conversion process of one time can greatly enhance the speed of the N-valued conversion process as a whole.

BRIEF DESCRIPTION OF THE DRAWINGS

These and other objects and advantages of the present invention will be more fully apparent from the following detailed description taken in conjunction with the accompanying drawings, in which:

FIG. 2 is a diagram schematically illustrating the configurations of a C dither matrix, an M dither matrix, a Y dither matrix, and a K dither matrix according to the first aspect;

FIG. 3 is a diagram schematically illustrating a configuration of a dither matrix memory;

FIG. 4 is a diagram schematically illustrating a configuration of data stored in a dither data memory;

FIG. 8 is a diagram schematically illustrating configurations of a C dither matrix, an M dither matrix, a Y dither matrix, and a K dither matrix according to a second aspect, which corresponds to FIG. 2;

FIG. 9 is a diagram schematically illustrating a configuration of data stored in a dither data memory according to the second aspect;

FIGS. 11A to 11D are diagrams schematically illustrating relations between a reference address of a row of the M dither matrix and of a row of the C dither matrix, the value of a counter, and a variable Next; and FIGS. 12A and 12B are diagrams schematically illustrating a conventional dither pattern and a two-valued conversion process using the conventional dither pattern.

DETAILED DESCRIPTION OF THE ILLUSTRATIVE ASPECTS

Figure 1:
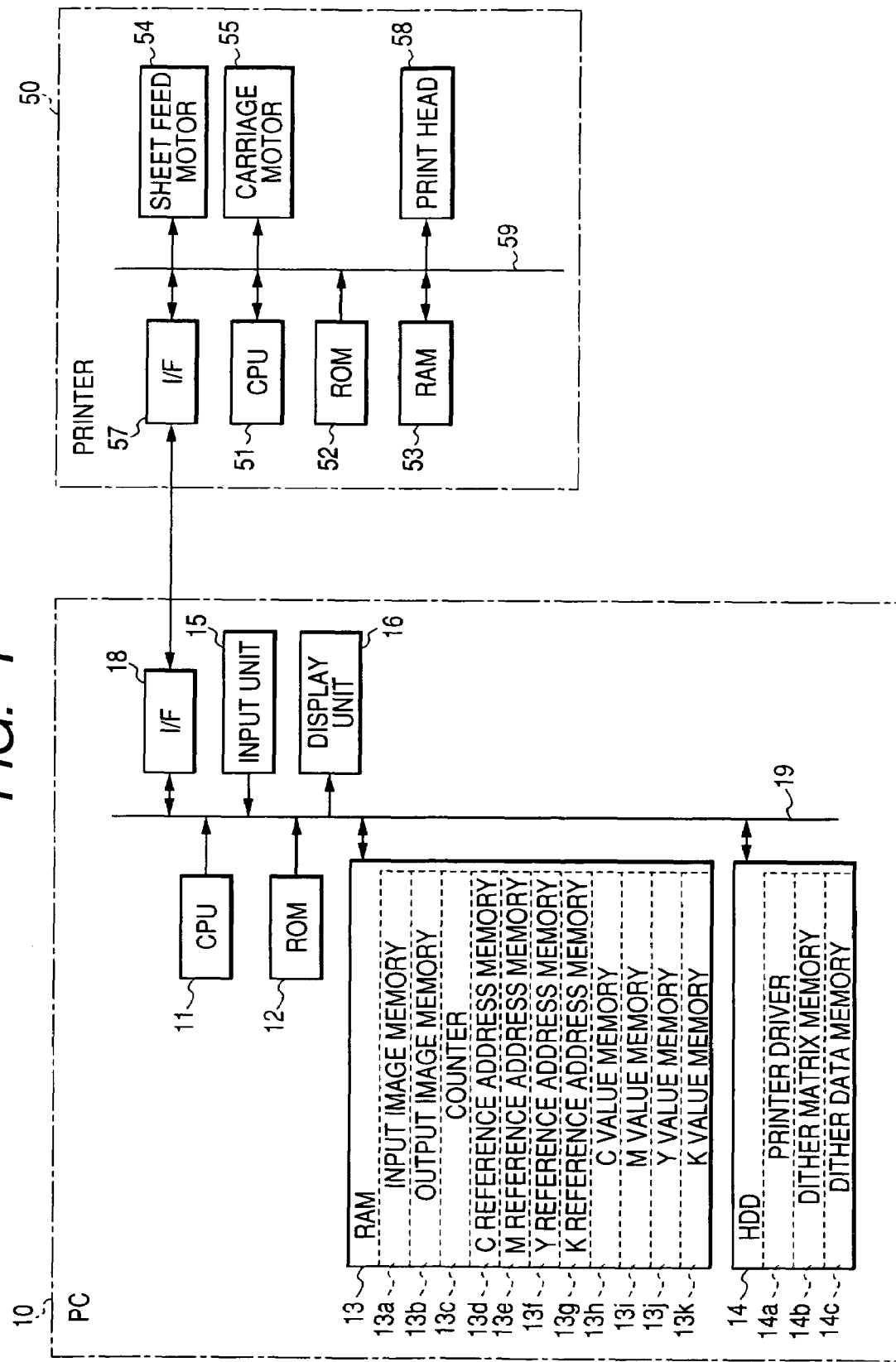
FIG. 1 is a block diagram illustrating an entire configuration of a print system comprising a pc serving as an image processing apparatus according to a first aspect of the present invention.

Hereinafter, exemplary aspects of the present invention will be described with reference to the attached drawings. FIG. 1 is a block diagram illustrating an entire configuration of a print system comprising a personal computer 10 (hereinafter, referred to as PC 10) serving as an image processing apparatus according to a first aspect of the present invention. The print system shown in FIG. 1 comprises a PC 10 and a printer 50 connected to the PC 10.

The PC 10 serves to perform a variety of processes such as a color conversion process and a two-valued conversion process to be described later (see FIG. 5) to document data or image data prepared by a document preparation application or an image preparation application, to convert the data into print data which can be printed by the printer 50, and then to output the print data to the printer 50.

As shown in FIG. 1, the PC 10 comprises a central processing unit (CPU) 11, a read only memory (ROM) 12, a random access memory (RAM) 13, a hard disk drive (HDD) 14, an input unit 15, a display unit 16, and a printer interface 18 (I/F 18) connected to the printer 50.

The CPU 11 is a central processing unit for intensively controlling the PC 10. The CPU 11 serves to execute a variety of programs such as a printer driver 14a for performing processes shown in the flowcharts of FIGS. 5, 6, and 7.

The ROM 12 is a readout-specific memory for storing a variety of control programs executed by the CPU 11 or data necessary for allowing the CPU 11 to execute the control programs.

The RAM 13 is a memory for temporarily storing the data or programs necessary for a variety of processes performed by the CPU 11. The RAM 13 comprises an input image memory 13a, an output image memory 13b, a counter 13c, a C reference address memory 13d, an M reference address memory 13e, a Y reference address memory 13f, a K reference address memory 13g, a C value memory 13h, an M value memory 13i, a Y value memory 13j, and a K value memory 13k. The input image memory 13a is a memory for storing input image data which would be subjected to the two-valued conversion process to be described later (see FIG. 5). The input image data are bit map data comprising color component values (gray scale values) of CMYK corresponding to the color densities of pixels. In the first aspect, it is assumed that the color component values of CMYK corresponding to the pixels constituting the input image data comprise a value from 0 to 255.

The output image memory 13b is a memory for storing output image memory. The input image data stored in the input image memory 13a are converted to the output image data in which the color component values of CMYK corresponding to the pixels constituting the input image data are converted into two values of "0" and "1" through the two-valued conversion process to be described later (see FIG. 5).

The counter 13c is a counter for holding values specifying a readout position of a row of a C dither matrix 20, an M dither matrix 22, a Y dither matrix 24, and a K dither matrix 26 to be described later (see FIG. 2). In the first aspect, the initial value of the counter 13c is "0" and is updated by 1 in the range of "0 to 36."

The C reference address memory 13d is a memory for storing as a C reference address (a reference value) an address specifying a readout start position (a reference position) of threshold values of a row as a readout target from C dither matrix 20 stored in a dither matrix memory 14b to be described later (see FIG. 3). The M reference address memory 13e is a memory for storing as an M reference address (a reference value) an address specifying a readout start position (a reference position) of the threshold values of a row as a readout target from M dither matrix 22 stored in the dither matrix memory 14b to be described later.

The Y reference address memory 13f is a memory for storing as a Y reference address (a reference value) an address specifying a readout start position (a reference position) of the threshold values of a row as a readout target from Y dither matrix 24 stored in the dither matrix memory 14b to be described later. The K reference address memory 13g is a memory for storing as a K reference address (a reference value) an address specifying a readout start position (a reference position) of the threshold values of a row as a readout target from K dither matrix 26 stored in the dither matrix memory 14b to be described later. In the first aspect, the reference addresses stored in the reference address memories 13d, 13e, 13f, and 13g are an address of the head threshold values of a row as a readout target.

The C value memory 13h is a memory for storing a color component value of C corresponding to a pixel of the input image data as a two-valued conversion process target. The M value memory 13i is a memory for storing a color component value of M corresponding to a pixel of the input image data as a two-valued conversion process target. The Y value memory 13j is a memory for storing a color component value of Y corresponding to a pixel of the input image data as a two-valued conversion process target. The K value memory 13k is a memory for storing a color component value of K corresponding to a pixel of the input image data as a two-valued conversion process target. The color component values of CMYK stored in the C value memory 13h, the M value memory 13i, the Y value memory 13j, and the K value memory 13k are multi-values (0 to 255 in the first aspect).

The HDD 14 is a hard disk readout unit comprising a hard disk and comprises a printer driver 14a, a dither matrix memory 14b, and a dither data memory 14c.

The printer driver 14a is a program for converting the document data or the image data prepared by a variety of applications such as a document preparation application or an image preparation application into print data which can be processed by the printer 50 and outputting the print data to the printer 50. The PC 10 converts the document data or the image data into the print data by the use of the printer driver 14a by performing an imaging process to a document or an image comprised in the document data or the image data and performing a variety of processes such as a color converting process of converting RGB data into CMYK data and a two-valued conversion process to be described later with reference to FIG. 5. The PC 10 converts input values comprising the multi-valued (0 to 255 in the first aspect) color component values of CMYK into the two-valued (0 or 1 in the first aspect) color component values of CMYK corresponding to the input values and outputs the converted color component values.

The dither matrix memory 14b is a memory for storing the C dither matrix 20, the M dither matrix 22, the Y dither matrix 24, and the K dither matrix 26. The configuration of the dither matrix memory 14b and the dither matrixes stored in the dither matrix memory 14b will be described later with reference to FIGS. 2 and 3.

The dither data memory 14c is a memory for storing the head addresses, the periods, and the number of rows of the C dither matrix 20; the M dither matrix 22; the Y dither matrix 24; and the K dither matrix 26 stored in the dither matrix memory 14b. The configuration of the dither data memory 14c will be described later with reference to FIG. 4.

The input unit 15 serves to input data or commands to the PC 10 and comprises a keyboard and a mouse. The display unit 16 serves to display letters or images so as to visually confirm the process details performed by the PC 10 or input data and comprises, for example, a CRT display device or a liquid crystal display device.

The I/F 18 serves to connect the PC 10 to the printer 50. The PC 10 transmits the print commands or the print data to the printer 50 through the I/F 18, thereby allowing the printer 50 to perform a print job on a recording sheet.

As shown in FIG. 1, the CPU 11, the ROM 12, the HDD 14, the input unit 15, the display unit 16, and the I/F are connected to each other through a bus line 19.

As shown in FIG. 1, the printer 50 connected to the PC 10 comprises a CPU 51, a ROM 52, a RAM 53, a sheet feed motor 54, a carriage motor 55, a print head 58, and an interface 57 (I/F 57) connected to the PC 10.

In the above-mentioned configuration of the printer 50, the CPU 51 serves to control operations of the printer 50 and to execute a variety of programs. The ROM 52 is a memory for storing programs for controlling the operations of the printer 50.

The sheet feed motor 54 is a stepping motor for feeding a recording sheet disposed at a predetermined position in the printer 50 in a downstream direction or a upstream direction, and the movement thereof is controlled by the CPU 51. The carriage motor 55 is a stepping motor for moving a carriage (not shown) mounted with the print head 58 in the direction perpendicular to the sheet feed direction by the sheet feed motor 54 so as to reciprocate between a start point as an initial position of the carriage and an end point as a limit position opposite to the start point, and the movement thereof is controlled by the CPU 51.

The print head 58 is an inkjet head comprising a plurality of nozzles and an actuator (all of which are not shown). The print head 58 serves to print predetermined letters or images by jetting ink from the nozzles with the driving of the actuator controlled by the CPU 51. The I/F 57 serves to connect the printer 50 to the PC 10. The print commands or print data are input from the PC 10 through the I/F 57.

As shown in FIG. 1, the CPU 51, the ROM 52, the RAM 53, the sheet feed motor 54, the carriage motor 55, the print head 58, and the I/F 57 are connected to each other through a bus line 59.

A dither table stored in the dither matrix memory 14b will be described now with reference to FIG. 2. FIG. 2 is a diagram schematically illustrating the configurations of the C dither matrix 20, the M dither matrix 22, the Y dither matrix 24, and the K dither matrix 26. In FIG. 2, only the entire configuration of the C dither matrix 20 is shown and the configurations other than first rows of the other dither matrixes 22, 24, and 26 are not shown. Here, the C dither matrix 20 is first described.

In a two-valued conversion process to be described later (see FIG. 5), the two-valued conversion process is performed by the use of the dither matrixes 20, 22, 24, and 26. The method of performing the two-valued conversion process using a dither matrix is referred to as a dither method. The dither method is a two-valued conversion process of increasing the number of gray scales in a pseudo manner on the basis of a principle that "when a plurality of pixels constituting a predetermined area is seen apart, it seems to be a color obtained by averaging the colors of all the pixels in the area." That is, as for a plurality of pixels constituting a predetermined area, the two-valued conversion process is performed by setting the pixels to different threshold values. A group of threshold values comprising the threshold values corresponding to the pixels in the predetermined area is referred to as a dither pattern. By performing the two-valued conversion process to the color component values corresponding to the pixels in the predetermined area within the scope of the dither pattern, it is possible to allow the color density, which is obtained by averaging the pixels in the predetermined area, to approximate to a desired color density.

Figure 2:
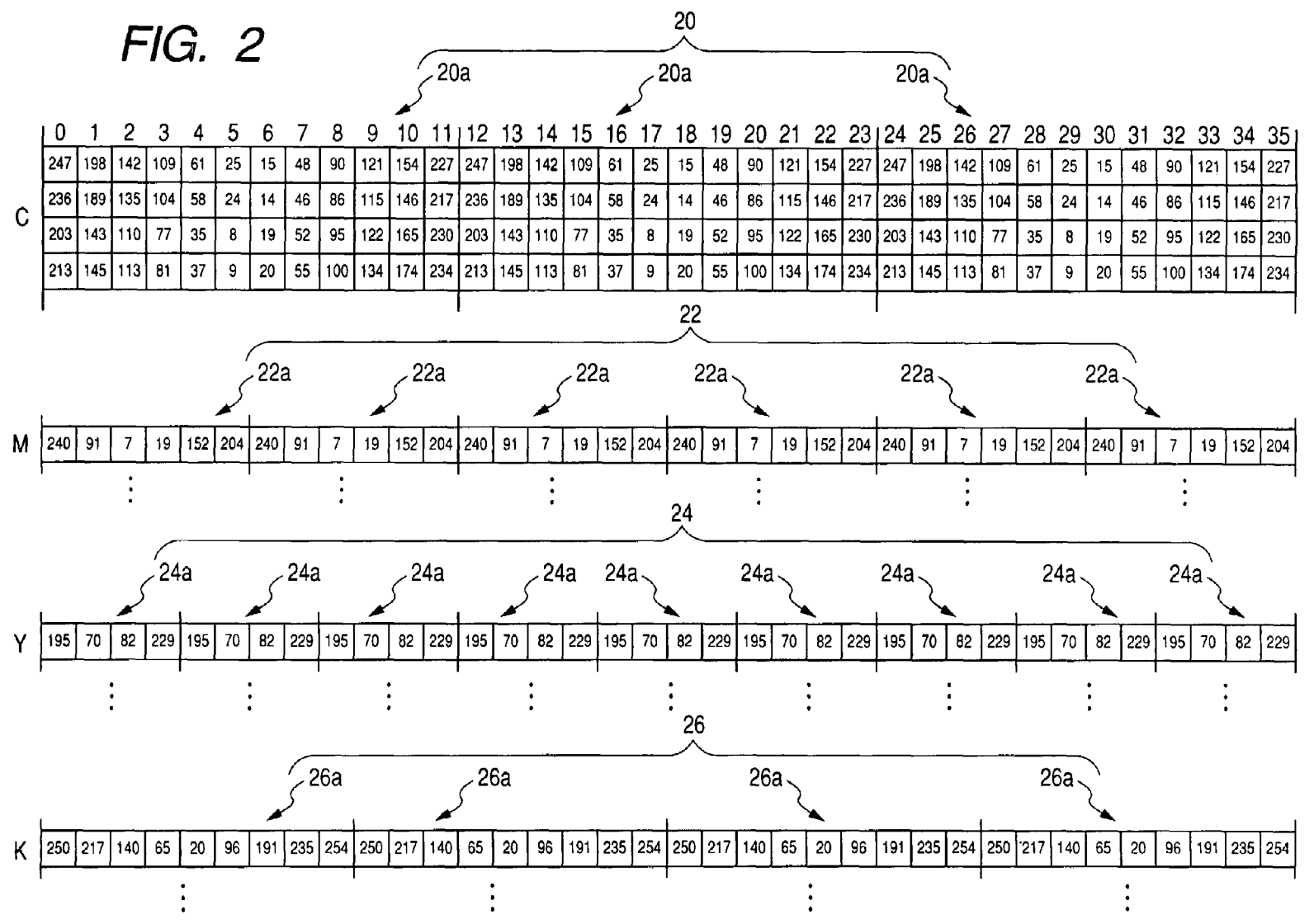

As shown in FIG. 2, the C dither matrix 20 comprises a configuration that three C dither patterns 20a are repeated. Each C dither pattern 20a is a group of threshold values of four rows (that is, a group of 48 threshold values) in which one row comprises 12 threshold values. That is, each C dither pattern 20a is a group of 48 threshold different values. In other words, each C dither pattern 20a is a dither pattern in which the C color density obtained by averaging the 48 pixels approximates to a desired color density.

The C dither matrix 20 is a group of threshold values in which three C dither patterns 20a are repeatedly arranged in the row direction. That is, the C dither matrix 20 is a group of threshold values in which one row comprises 36 (=12×3) threshold values.

As shown in FIG. 2, the C dither pattern 20a, the M dither pattern 22a, the Y dither pattern 24a, and the K dither pattern 26a comprise different numbers of threshold values constituting one row. That is, one row of the M dither pattern 22a comprises 6 threshold values, one row of the Y dither pattern 24a comprises 4 threshold values, and one row of the K dither pattern 26a comprises 9 threshold values.

However, since the M dither matrix 22 comprises such a configuration that 6 M dither patterns 22a are repeated, one row thereof comprises 36 (=6×6) threshold values. Since the Y dither matrix 24 comprises such a configuration that 9 Y dither patterns 24a are repeated, one row thereof comprises 36 (=4×9) threshold values. Since the K dither matrix 26 comprises such a configuration that 4 K dither patterns 26a are repeated, one row thereof comprises 36 (=9×4) threshold values. In this way, the dither patterns 20a, 22a, 24a, and 26a comprise different numbers of threshold values constituting one row, but the dither matrixes 20, 22, 24, and 26 comprise the same number of threshold values constituting one row, that is, 36. That is, the respective dither matrixes 20, 22, 24, and 26 are constructed so that the number of threshold values (36 in the first aspect) constituting one row of the respective dither matrixes 20, 22, 24, and 26 is the least common multiple of the number of threshold values (12, 6, 4, and 9 in the first aspect) constituting one row of the respective dither patterns 20a, 22a, 24a, and 26a.

A configuration of the dither matrix memory 14b will be described with reference to FIG. 3. FIG. 3 is a diagram schematically illustrating the configuration of the dither matrix memory 14b. The dither matrix memory 14b is a memory for storing the C dither matrix 20, the M dither matrix 22, the Y dither matrix 24, and the K dither matrix 26. In FIG. 3, only the threshold values in two rows of the C dither matrix 20 are illustrated and the others are not illustrated.

In the left side of FIG. 3, the addresses in the dither matrix memory 14b are marked by hexadecimal numbers. In a color conversion process to be described later (see FIG. 5), the threshold value stored in a specified address is read out from the dither matrix memory 14b and is used for the two-valued conversion process. In FIG. 3, the threshold values of a row of the C dither matrix 20 are surrounded with a thick solid line.

A configuration of the data stored in the dither data memory 14c will be described with reference to FIG. 4. FIG. 4 is a diagram schematically illustrating the configuration of the data stored in the dither data memory 14c. As shown in FIG. 4, the head address, the period, and the number of rows of the respective dither matrix 20, 22, 24, and 26 are stored in the dither data memory 14c. The head address is an address of a threshold value in the first row and the first column of the respective dither matrixes 20, 22, 24, and 26. For example, the threshold value in the first row and the first column of the C dither matrix 20 is stored at a position specified by "0x00001000" in the dither matrix memory 14b (see FIG. 3).

The period corresponds to the number of threshold values constituting one row of the dither matrixes 20, 22, 24, and 26. In the first aspect, "36" is stored as the period of all the dither matrixes. The number of rows corresponds to the number of rows of the respective dither matrixes 20, 22, 24, and 26. For example, since the C dither matrix 20 comprises 4 rows (see FIG. 2), "4" is stored as the number of rows.

Figure 5:
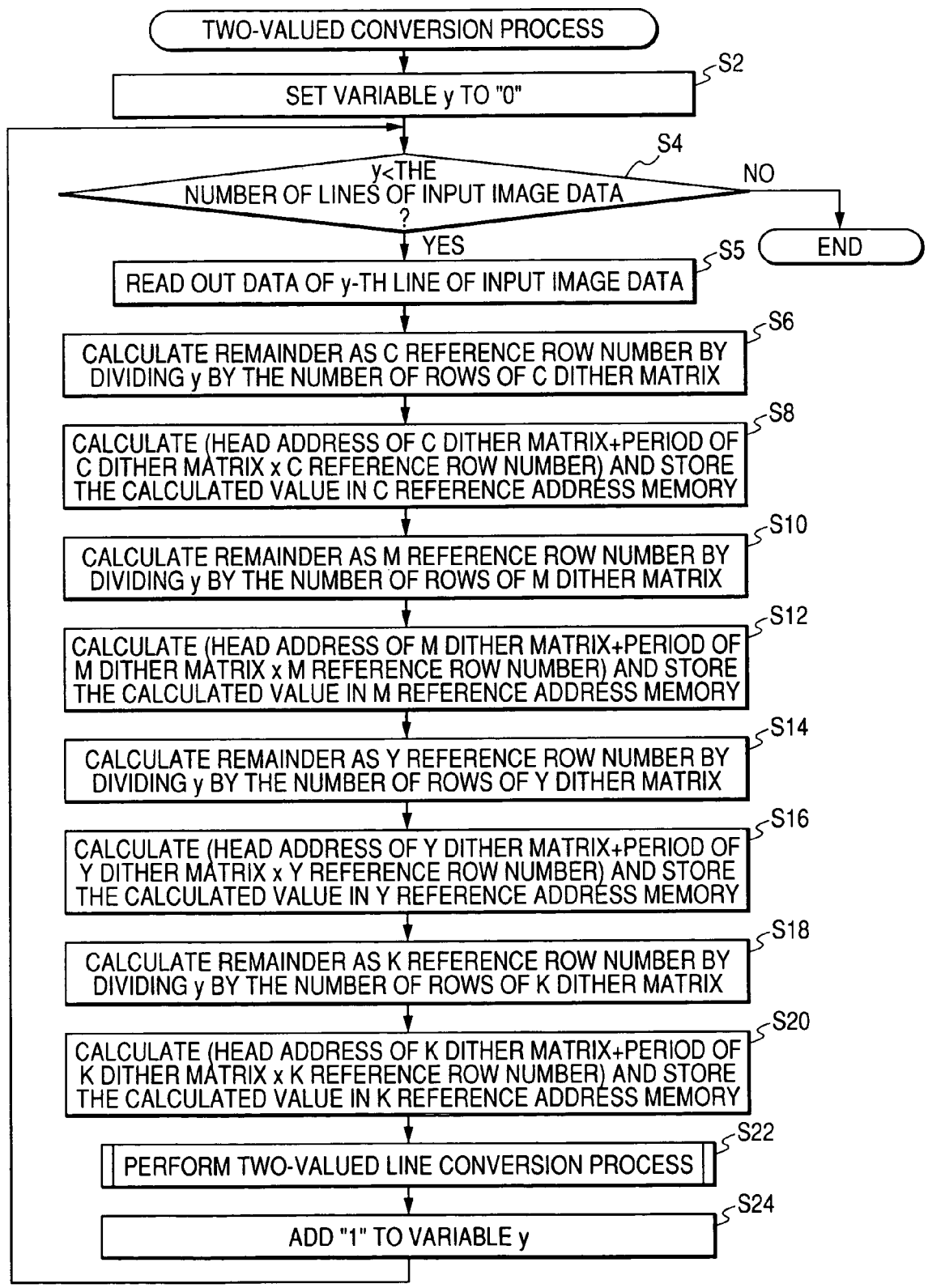
FIG. 5 is a flowchart illustrating a two-valued conversion process performed by the PC.

The two-valued conversion process performed by the PC 10 will be described with reference to FIG. 5. FIG. 5 is a flowchart illustrating the two-valued conversion process performed by the PC 10. The two-valued conversion process is a process which is activated when the input image data are stored in the input image memory 13a. In the two-valued conversion process, the input image data are subjected to the two-valued conversion process in a unit of a line.

First, a variable y is set to "0" (S2). Then, it is checked whether the variable y is smaller than the total number of lines of the input image data (S4).

When the variable y is smaller than the total number of lines of the input image data (S4: Yes), the data in the y-th line of the input image data are read out (S5). Then, a C reference row number, which is a value corresponding to a row number of the C dither matrix 20 in which the threshold values should be referred to for performing the two-valued conversion process to the data of the y-th line as the processing target, is calculated (S6). Specifically, the number of rows of the C dither matrix 20 is read out from the dither matrix memory 14c, and the remainder when the variable y is divided by the number of rows of the C dither matrix (4 in the first aspect) is calculated as the C reference row number. For example, when the data in the 0-th line of the input image data are read out, "0" is set to the C reference row number. When the data in the first line of the input image data are read out, "1" is set to the C reference row number. When the data in the second line of the input image data are read out, "2" is set to the C reference row number. When the data in the third line of the input image data are read out, "3" is set to the C reference row number. When the data in the fourth line of the input image data are read out, "0" is set to the C reference row number. That is, in the C dither matrix 20, any one of the 0-th row to the third row is referred to in accordance with the number of lines of the two-valued conversion process target, and after the 0-th row to the third row are sequentially referred to, the 0-th row is referred to again.

Next, a reference address corresponding to the address of the head threshold value in the first row as the readout target of the C dither matrix 20 is calculated (S8). Specifically, by reading out the head address (0x00001000 in the first aspect) of the C dither matrix 20 and the period (36 in the first aspect) of the C dither matrix 20 from the dither data memory 14c, and adding the result obtained by multiplying the C reference row number by the period of the C dither matrix to the readout head address, the C reference address is calculated. The calculated C reference address is stored in the C reference address memory 13d.

Next, an M reference row number, which is a value specifying a row number of the M dither matrix 22 in which the threshold values should be referenced for performing the two-valued conversion process to the data of the y-th line as the processing target, is calculated (S10). Then, an M reference address, specifying a position where the head threshold value in the first row of the M dither matrix 22 to be referenced is stored, is calculated, and the calculated M reference address is stored in the M reference address memory 13e (S12).

Next, a Y reference row number, which is a value specifying a row number of the M dither matrix 24 in which the threshold values should be referenced for performing the two-valued conversion process to the data of the y-th line as the processing target, is calculated (S14). Then, a Y reference address, specifying a position where the head threshold value in the first row of the Y dither matrix 24 to be referenced is stored is calculated, and the calculated Y reference address is stored in the Y reference address memory 13f (S16).

Next, a K reference row number, which is a value specifying a row number of the K dither matrix 26 in which the threshold values should be referenced for performing the two-valued conversion process to the data of the y-th line as the processing target, is calculated (S18). Then, a K reference address specifying a position where the head threshold value in the first row of the K dither matrix 26 to be referenced is stored is calculated, and the calculated K reference address is stored in the K reference address memory 13g (S20).

Since the methods of calculating the M reference row number, the Y reference row number, the K reference row number, the M reference address, the Y reference address, and the K reference address are similar to the method of calculating the C reference row number and the C reference address described above, the methods are shown only in the flowchart of FIG. 5 and detailed description thereof is omitted.

In this way, when the reference addresses of the dither matrixes 20, 22, 24, and 26 are determined, the threshold values are read out from the respective dither matrixes 20, 22, 24, and 26 on the basis of the determined reference addresses, and the two-valued conversion process of the data of a row of the input image data is performed on the basis of the read-out threshold values (S22). The two-valued conversion process of data is now described. When the data of a row of the input image data are subjected to the two-valued conversion process, "1" is added to the variable y and the process of S4 is performed again (S24). Accordingly, the next line is read out from the input image data and the above-mentioned processes are repeated. When all the lines of the input image data are subjected to the two-valued conversion process and the variable y is equal to the number of lines of the input image data (S4: No), the procedure is ended.

Figure 6:
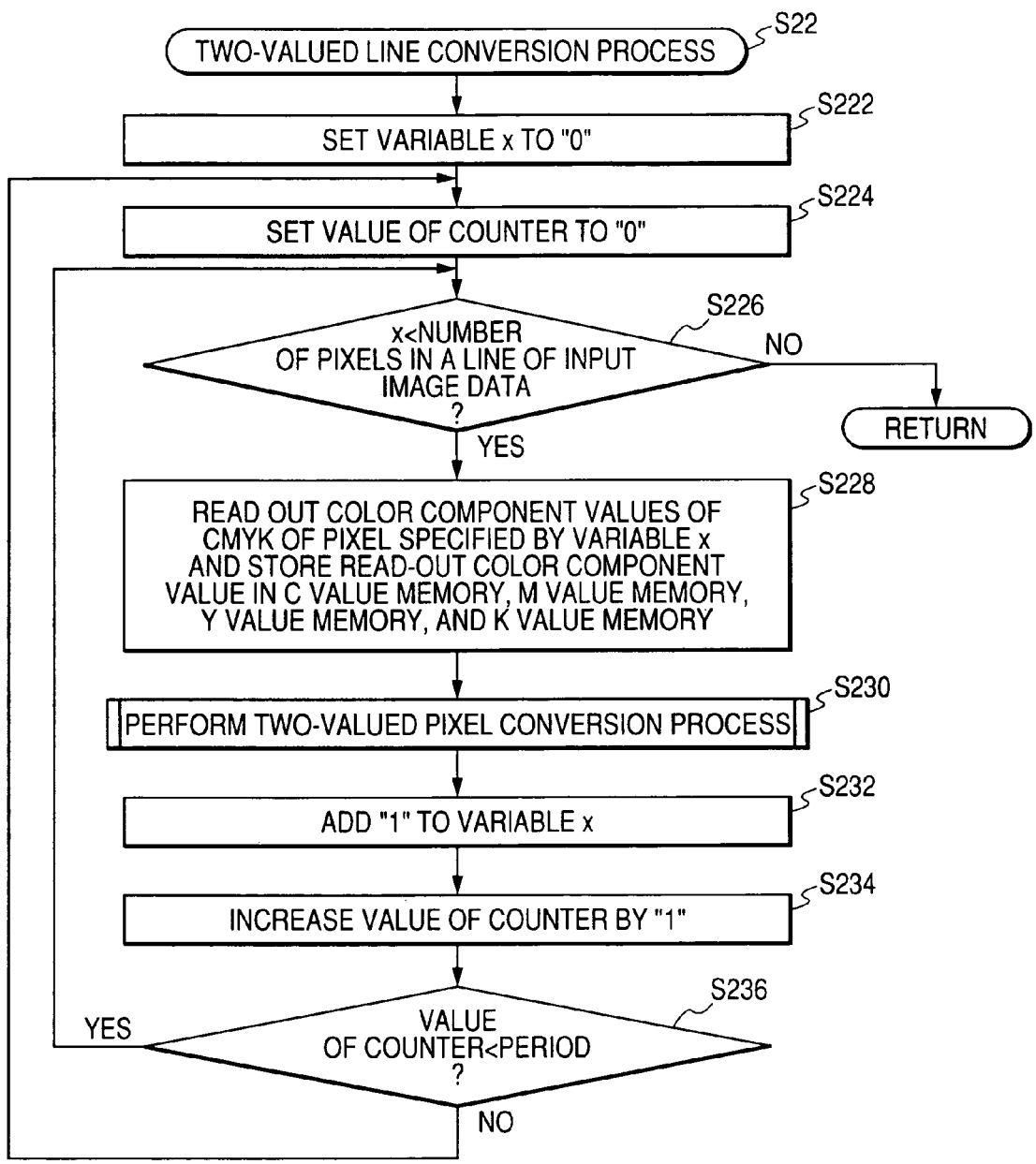
FIG. 6 is a flowchart illustrating a two-valued line conversion process.

The two-valued line conversion process (S22) is now described with reference to FIG. 6. FIG. 6 is a flowchart illustrating the two-valued line conversion process. In the two-valued conversion process, first, a variable is set to "0" (S222). The variable x is a variable indicating which pixel number from the head is the target of the two-valued conversion process among the data of a row of the input image data.

Next, the value of the counter 13c is set to an initial value "0" (S224). The value of the counter 13c is a value used for a two-valued pixel conversion process to be described later and is a value specifying a readout position of a row of the respective dither matrixes 20, 22, 24, and 26. When the value of the counter 13c is the initial value "0", the head threshold value (that is, a threshold value specified as the reference address) of a row of the respective dither matrixes 20, 22, 24, and 26 is read out in the two-valued pixel conversion process. The value of the counter 13c is increased by "1" in the process of S234 to be described later, by reading out the threshold values from the plural dither matrixes 20, 22, 24, and 26.

Next, it is determined whether the variable x is smaller than the number of pixels constituting a row of the input image data (S226). When the variable x is smaller than the number of pixels constituting a row of the input image data (S226: Yes), the color component values of CMYK comprised in the x-th pixel from the head pixel constituting the data of a row of the input image data are read and the read-out color component values of CMYK are stored in the C value memory 13h, the M value memory 13i, the Y value memory 13j, and the K value memory 13k, respectively (S228). Then, the two-valued pixel conversion process for converting the values stored in the C value memory 13h, the M value memory 13i, the Y value memory 13j, and the K value memory 13k into two-valued values is performed (S230). The two-valued pixel conversion process is described below.

Next, "1" is added to the variable x (S232), and the counter 13c is increased by "1" (S234). That is, in the two-valued pixel conversion process (S230), when the threshold values are read out from the respective dither matrixes 20, 22, 24, and 26, the value of the counter is increased by "1." Then, it is determined whether the value of the counter 13c is smaller than the period (36 in the first aspect) of the dither matrixes 20, 22, 24, and 26. As described later, since the value of the counter 13c is a value indicating from which position with respect to the reference address the threshold value should be read out, it is possible to determine whether the threshold values of a row have been read out from the dither matrixes 20, 22, 24, and 26, respectively (that is, whether the tail threshold value of the row has been read out), by comparing the value of the counter 13c with the period of the dither matrixes 20, 22, 24, and 26.

When the value of the counter 13c is smaller than the period (S236: Yes), the process of S226 is performed again. On the other hand, when the value of the counter 13c is equal to the period (S236: No), that is, when the value of the counter 13c is 36 and it is determined that the threshold values have been read out from the respective dither matrixes 20, 22, 24, and 26, the value of the counter 13c is set to "0" again in the process of S224 (S224).

When the two-valued conversion process is performed to all the pixels constituting the data of a row of the input image data, the value of the variable x is equal to the number of pixels of a row of the input image data (S226: No). Accordingly, the two-valued line conversion process ends, and the process of S24 shown in FIG. 5 is performed again.

Figure 7:
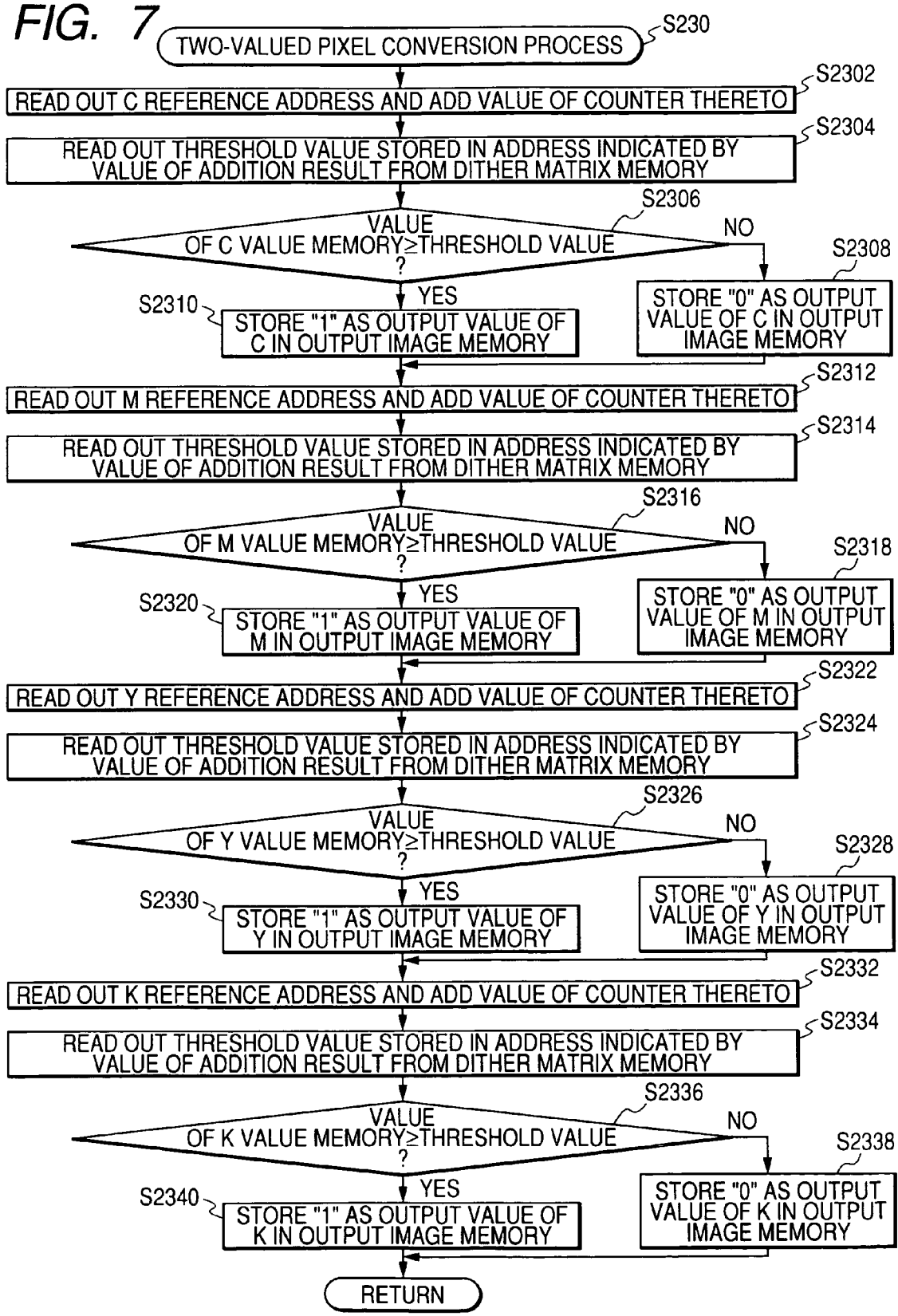
FIG. 7 is a flowchart illustrating a two-valued pixel conversion process.

On the other hand, the two-valued pixel conversion process (S230) is described with reference to FIG. 7. FIG. 7 is a flowchart illustrating the two-valued pixel conversion process. First, the C reference address stored in the C reference address memory 13d is read out, and then the value of the counter 13c is added to the C reference address (S2302). Then, the threshold value of the address indicated by the value of the addition result is read out from the C dither matrix 20 stored in the dither matrix memory 14b (S2304). That is, since the C reference address is an address specifying the position in which the head threshold value of a row to be referenced and the value of the counter 13c is a value indicating a value indicating from which position with respect to the reference address the threshold value should be read out, it is possible to specify the readout position by adding the value of the counter 13c to the reference address. For example, when "0x00001000" (hexadecimal number) is stored as the C reference address, the threshold value of the position indicated by the address "0x00001003", which is obtained by adding the value "3" of counter 13c to the C reference address is read out.

As described above, when the two-valued pixel conversion process is performed, the value of the counter 13c is increased by "1." Accordingly, the threshold values constituting a row to be referred to in the C dither matrix 20 can be sequentially read out from the head. For example, after the threshold value of the position specified by the address "0x00001003" is read out and then the two-valued conversion process of a pixel is performed thereto, the threshold value of the position specified by the address "0x00001004" is read out.

Next, it is determined whether a color component value of C stored in the C value memory 13h is greater than or equal to the read-out threshold value (S2306). When the color component value of C is greater than or equal to the read-out threshold value (S2306: Yes), "1" is stored as the output value of C in the output image memory 13b (S2310). On the other hand, when the color component value of C is smaller than the read-out threshold value (s2306: No), "0" is stored as the output value of C in the output image memory 13b (S2308).

Next, the M reference address stored in the M reference address memory 13e is read out and the value of the counter 13c is added thereto (S2312). Then, the threshold value stored at the position specified by the address indicated by the value of the addition result is read out from the M dither matrix 22 stored in the dither matrix memory 14*b* (S2314).

Next, it is determined whether a color component value of M stored in the M value memory 13*i* is greater than or equal to the read-out threshold value (S2316). When the color component value of M is greater than or equal to the read-out threshold value (S2316: Yes), "1" is stored as the output value of M in the output image memory 13*b* (S2320). On the other hand, when the color component value of M is smaller than the read-out threshold value (S2316: No), "0" is stored as the output value of M in the output image memory 13*b* (S2318).

Next, the Y reference address stored in the Y reference address memory 13*f* is read out and the value of the counter 13*c* is added thereto (S2322). Then, the threshold value stored at the position specified by the address indicated by the value of the addition result is read out from the Y dither matrix 24 stored in the dither matrix memory 14*b* (S2324).

Next, it is determined whether a color component value of Y stored in the Y value memory 13*j* is greater than or equal to the read-out threshold value (S2326). When the color component value of Y is greater than or equal to the read-out threshold value (S2326: Yes) "1" is stored as the output value of Y in the output image memory 13*b* (S2330). On the other hand, when the color component value of Y is smaller than the read-out threshold value (S2326: No), "0" is stored as the output value of Y in the output image memory 13*b* (S2328).

Next, the K reference address stored in the K reference address memory 13*g* is read out and the value of the counter 13*c* is added thereto (S2332). Then, the threshold value stored at the position specified by the address indicated by the value of the addition result is read out from the K dither matrix 26 stored in the dither matrix memory 14*b* (S2334).

Next, it is determined whether a color component value of K stored in the K value memory 13*k* is greater than or equal to the read-out threshold value (S2336). When the color component value of K is greater than or equal to the read-out threshold value (S2336: Yes), "1" is stored as the output value of K in the output image memory 13*b* (S2340). On the other hand, when the color component value of K is smaller than the read-out threshold value (S2336: No), "0" is stored as the output value of K in the output image memory 13*b* (S2338).

In this way, when the color component values of CMYK comprised in a pixel has been subjected to the two-valued conversion process, the two-valued pixel conversion process ends, and the process of S232 of FIG. 6 is performed again.

According to the first aspect described above, the number of threshold values constituting one row of the plural kinds of dither matrixes 20, 22, 24, and 26 is a common multiple of the number of threshold values constituting one row of the plural kinds of dither patterns 20*a*, 22*a*, 24*a*, and 26*a*. That is, the numbers of threshold values constituting one row of the respective dither patterns 20*a*, 22*a*, 24*a*, and 26*a* are different from each other, but the number of threshold values constituting one row of the plural kinds of dither matrixes 20, 22, 24, and 26 are equal to each other. Accordingly, the counter 13*c* for holding the values specifying the readout positions of a row of the respective dither matrixes 20, 22, 24, and 26 can be used in common. As a result, in comparison with the case that a counter is provided for each of the plural kinds of dither matrixes 20, 22, 24, and 26, the number of counters can be reduced, thereby reducing the number of processes necessary for the control of the counters as a whole. Specifically, when the number of pixels as processing targets is large, the slight increase in speed of the two-valued conversion process of one time (a pixel) can greatly enhance the processing speed of the two-valued conversion process as a whole.

Since the number of threshold values constituting a row of the plural kinds of dither matrixes 20, 22, 24, and 26 is the least common multiple of the numbers of threshold values constituting the rows of the plural kinds of dither patterns 20*a*, 22*a*, 24*a*, and 26*a*, it is possible to decrease the amount of data of the plural kinds of dither matrixes 20, 22, 24, and 26 as much as possible.

When the value of the counter is increased to 36 and it is determined on the basis thereof that the threshold values of a row are read out from the plural kinds of dither matrixes 20, 22, 24, and 26, the value of the counter 13*c* is set to the initial value "0" and then the threshold values are read out again from the head of a row of the plural kinds of dither matrixes 20, 22, 24, and 26. Accordingly, even when counters are not provided for the plural kinds of dither matrixes 20, 22, 24, and 26, respectively, it is possible to read out the threshold values from the dither matrixes 20, 22, 24, and 26 with a predetermined period. That is, since the counters may not be provided for the plural kinds of dither matrixes 20, 22, 24, and 26, respectively, it is possible to speed up the two-valued conversion process.

On the basis of the values obtained by adding the value of the counter 13*c* to the reference addresses of the dither matrixes 20, 22, 24, and 26 stored in the C reference address memory 13*d*, the M reference address memory 13*e*, the Y reference address memory 13*f*, and the K reference address memory 13*g*, the threshold values used for the two-valued conversion process are read out from the plural kinds of dither matrixes 20, 22, 24, and 26, respectively. Accordingly, even when counters are not provided for the plural kinds of dither matrixes 20, 22, 24, and 26, respectively, it is possible to read out the threshold values from the dither matrixes 20, 22, 24, and 26 with a predetermined period. That is, since the counters may not be provided for the plural kinds of dither matrixes 20, 22, 24, and 26, respectively, it is possible to speed up the two-valued conversion process.

Hereinafter, a second aspect of the two-valued conversion process performed by the PC 10 will be described with reference to FIGS. 8, 9 10 and 11A to 11B. In the first aspect, the numbers of the threshold values constituting a row of the plural kinds of dither matrixes 20, 22, 24, and 26 are equal to each other However, the second aspect is different from the first aspect, in that plural kinds of matrixes 30, 32, 34, and 36 are provided so that the numbers of threshold values constituting the rows of the plural kinds of matrixes 30, 32, 34, and 36, respectively, are one of "n" (18 in the second aspect) and "m" (28 in the second aspect). In the first aspect, each reference address stored in the reference address memories 13*d*, 13*e*, 13*f*, and 13*g* is an address corresponding to the address of the head threshold value of a row as the readout target. However, the second aspect is different from the first aspect, in that the reference address is not necessarily an address corresponding to the address of the head threshold value of a row. In the second aspect, the same elements as the first aspect are denoted by the same reference numerals and description thereof is omitted.

Figure 8:
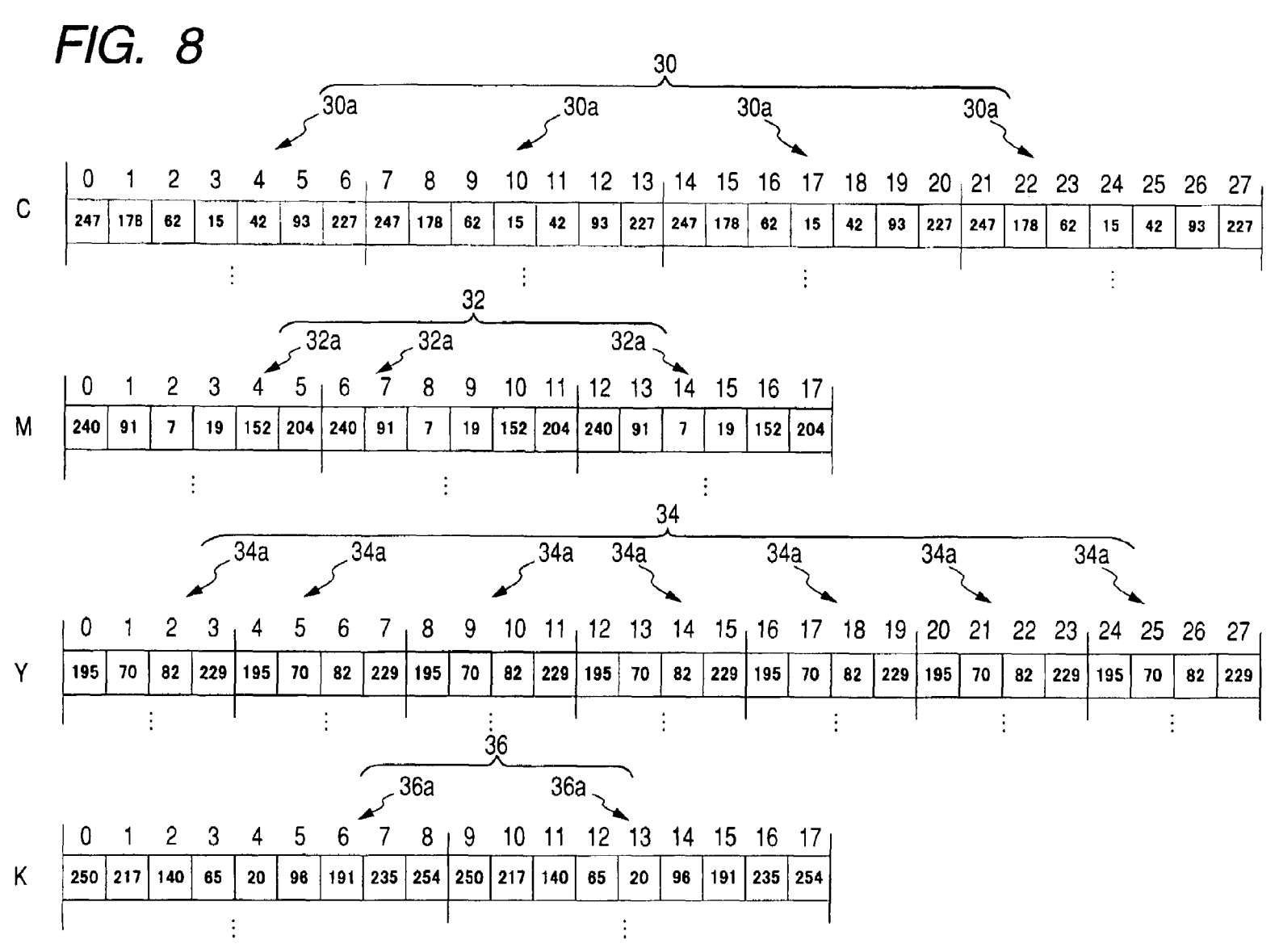

The configurations of the plural dither matrixes 30, 32, 34, and 36 used in the second aspect are described with reference to FIG. 8. FIG. 8 is a diagram schematically illustrating the configurations of the C dither matrix 30, the M dither matrix 32, the Y dither matrix 34, and the K dither matrix 36, and corresponds to FIG. 2. In FIG. 8, only a row of the respective dither matrixes 30, 32, 34, and 36 is shown and the other rows are omitted.

As shown in FIG. 8, the C dither matrix 30 comprises such a configuration that 7 C dither patterns 30*a* are repeated. Each C dither pattern 30*a* is a group of threshold values in 4 rows (that is, a group of 28 threshold values) in which each row comprises 7 threshold values, and each C dither pattern 30a comprise 28 threshold values different from each other. That is, the C dither pattern 32a is a dither pattern set so that the color (C) density obtained by averaging the 28 pixels approximates to a desired color density.

As shown in FIG. 8, the C dither pattern 30a, the M dither pattern 32a, the Y dither pattern 34a, and the K dither pattern 36a comprise different numbers of threshold values constituting a row. That is, a row of the M dither pattern 32a comprises 6 threshold values, a row of the Y dither pattern 34a comprises 4 threshold values, and a row of the K dither pattern 36a comprises 9 threshold values.

However, since the M dither matrix 32 comprises such a configuration that three M dither patterns 32a are repeated, a row thereof comprises 18 (=6×3) threshold values. Since the Y dither matrix 34 comprises such a configuration that seven Y dither patterns 34a are repeated, a row thereof comprises 18 (=4×7) threshold values. Since the K dither matrix 36 comprises such a configuration that two K dither patterns 36a are repeated, a row thereof comprises 18 (=9×2) threshold values. In this way, the dither patterns 30a, 32a, 34a, and 36a comprise the different numbers of threshold values constituting a row, but the C dither matrix 30 and the Y dither matrix 34 comprise the same number of threshold values, that is, 28 threshold values, constituting a row and the M dither matrix 32 and the K dither matrix 36 comprise the same number of threshold values, that is, 18 threshold values, constituting a row.

That is, the C dither matrix 30 and the Y dither matrix 34 comprise such a configuration that the number of threshold values constituting a row is the least common multiple of the number of threshold values constituting a row of the C dither pattern 30a and the Y dither pattern 34a. The M dither matrix 32 and the K dither matrix 36 comprise such a configuration that the number of threshold values constituting a row is the least common multiple of the number of threshold values constituting a row of the M dither pattern 32a and the K dither pattern 36a. In the second aspect, instead of the plural kinds of dither matrixes 20, 22, 24, and 26 described in the first aspect, it is assumed that the C dither matrix 30, the M dither matrix 32, the Y dither matrix 34, and the K dither matrix 36 are stored in the dither matrix memory 14b.

The configuration of data stored in the dither data memory 14c according to the second aspect is described with reference to FIG. 9. FIG. 9 is a diagram schematically illustrating the configuration of the data stored in the dither data memory 14c. As shown in FIG. 9, the head address, the period, and the number of rows of the respective dither matrixes 30, 32, 34, and 36 are stored in the dither data memory 14c, as described in the first aspect.

As shown in FIG. 9, although the periods are all "36" in the first aspect, the period (corresponding to the number of threshold values constituting a row of the respective dither matrixes 30, 32, 34, and 36) is any one of "18" and "28" in the second aspect. The shorter period is referred to as "period S" and the longer period is referred to as "period L," hereinafter. In the second aspect, "18" corresponds to the period S and "28" corresponds to the period L.

Figure 10:
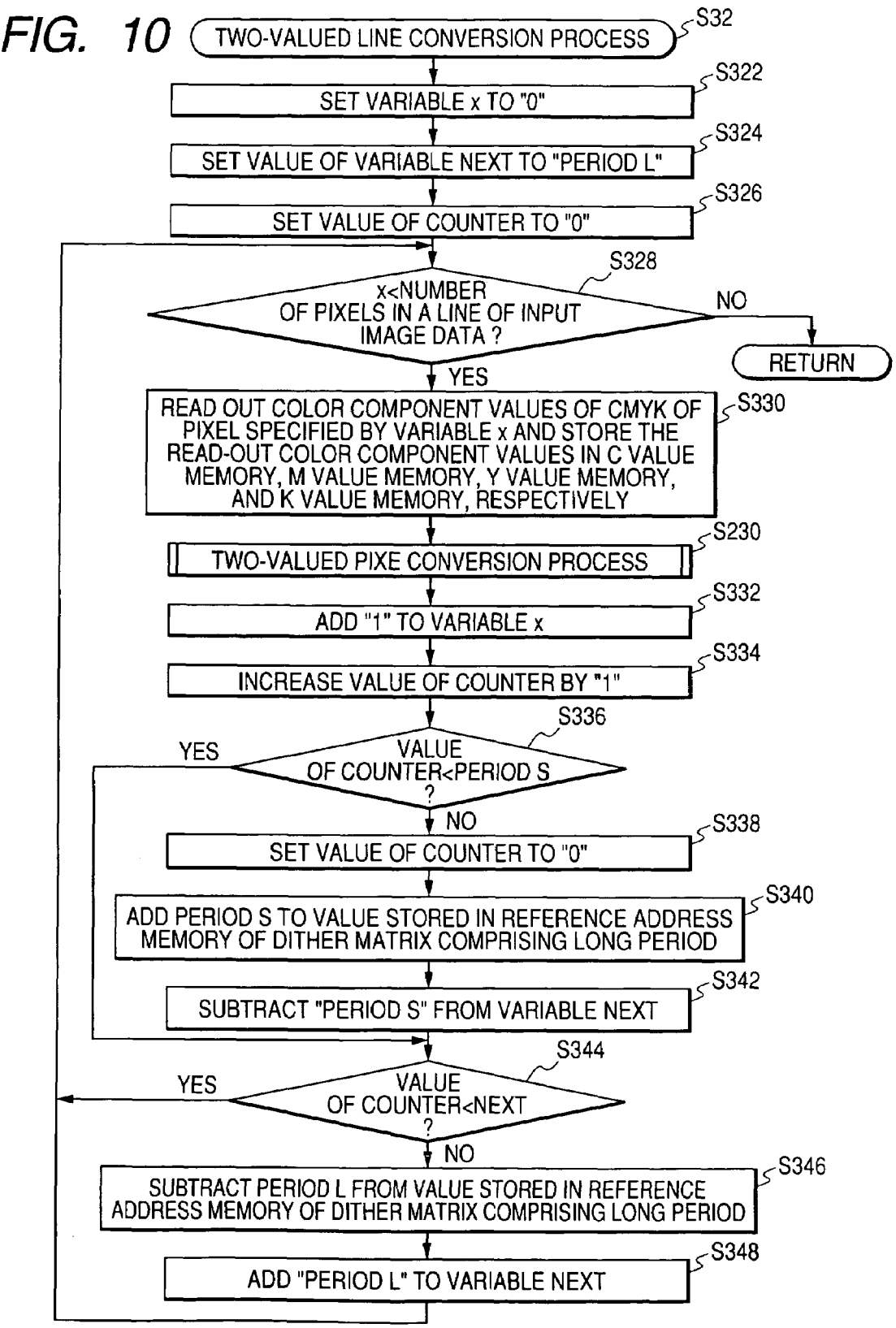
FIG. 10 is a flowchart illustrating a two-valued line conversion process according to the second aspect, which corresponds to FIG. 6.

A two-valued line conversion process (S32) according to the second aspect is described with reference to FIG. 10. FIG. 10 is a flowchart illustrating the two-valued line conversion process according to the second aspect and corresponds to FIG. 6. The two-valued line conversion process (S32) to be described with reference to FIG. 10 is a process to be performed instead of the two-valued line conversion process (S22 of FIG. 5) according to the first aspect. Accordingly, similarly to the first aspect, at the time of starting the two-valued line conversion process (S32), a reference address corresponding to the address of the head threshold value of a row as a readout target is stored in each of the reference address memories 13d, 13e, 13f, and 13g.

In the two-valued line conversion process according to the second aspect, first, the variable x is set to "0" (S322). The variable x is a variable indicating which pixel number from the head is the target of the two-valued conversion process among the data of a row of the input image data. Next, the value of a variable Next is set to "period L" (S324). The variable Next is a value indicating an update time value corresponding to the times when the counter 13c is updated after the value of the counter 13c is initialized ("0" in the second aspect) until the threshold values of a row are read out from the C dither matrix 30 and the Y dither matrix 34 (both of which comprise the period L). The variable Next is stored in a predetermined area of the RAM 13. In the second aspect, the RAM 13 corresponds to the update number storage unit.

Next, the value of the counter 13c is set to the initial value "0" (S326). The value of the counter 13c is a value used for the two-valued pixel conversion process to be described later and is a value specifying a readout position of a row of the respective dither matrixes 30, 32, 34, and 36. When the value of the counter 13c is the initial value "0," the head threshold value of a row of each of the M dither matrix 32 and the K dither matrix 36 (all of which comprise the period S) is read out in the two-valued pixel conversion process (S230) to be described later. The value of the counter 13c is increased by "1" in the process of S334 to be described later, by reading out the threshold values from the plural dither matrixes 30, 32, 34, and 36.

Next, it is determined whether the variable x is smaller than the number of pixels constituting a row of the input image data (S328). When the variable x is smaller than the number of pixels constituting a row of the input image data (S328: Yes), the color component values of CMYK comprised in the x-th pixel from the head pixel constituting the data of a row of the input image data are read out and the read-out color component values of CMYK are stored in the C value memory 13h, the M value memory 13i, the Y value memory 13j, and the K value memory 13k, respectively (S330). Then, the two-valued pixel conversion process for converting the values stored in the C value memory 13h, the M value memory 13i, the Y value memory 13j, and the K value memory 13k into two-valued values is performed (S230). Since the two-valued pixel conversion process (S230) is similar to that of the first aspect, it is denoted by the same reference numeral and detailed description and figure thereof are omitted.

Next, "1" is added to the variable x (S332) and the counter 13c is increased by "1" (S334). That is, in the two-valued pixel conversion process (S230), when the threshold values are read out from the respective dither matrixes 30, 32, 34, and 36, the value of the counter is increased by "1." Then, it is determined whether the value of the counter 13c is smaller than the period S (18 in the second aspect). As described later, since the value of the counter 13c is a value indicating from which position with respect to the reference address the threshold value should be read out, it is possible to determine whether the threshold values of a row have been read out from the M dither matrixes 32 and the K dither matrix 36 (all of which comprise the period S) (that is, whether the tail threshold value of the row has been read out), by comparing the value of the counter 13c with the period S.

Next, it is determined whether the value of the counter 13c is smaller than the period S. When the value of the counter 13c is smaller than the period S (S336: Yes), it is determined whether the value of the counter 13c is smaller than the variable Next (S344). When the value of the counter 13c is smaller than the variable Next (S344: Yes), the process of S328 is performed again.

Here, the relations between the reference address, the value of the counter 13c, and the variable Next are described with reference to FIGS. 11A to 11D. FIGS. 11A to 11D are diagrams schematically illustrating the relations between the reference address, the value of the counter 13c, and the variable Next of a row of the M dither matrix 32 (comprising a period S) and a row of the C dither matrix 30 (comprising a period L). Since the relation between the readout position and the value of the counter 13c in the Y dither matrix 34 (comprising a period L) is substantially similar to that in the C dither matrix 30, and the relation between the readout position and the value of the counter 13c in the K dither matrix 36 (comprising a period S) is substantially similar to that of the M dither matrix 32, the figures thereof will be omitted.

FIG. 11A is a diagram illustrating a state right after performing the process of S334. The reference address and the variable Next are indicated by "△" and the position specified by the address, which is a result of adding the value of the counter 13c to the reference address, is indicated by "▲." As shown in FIG. 11A, since the value of the counter 13c is started from 0, the head threshold value of a row of the respective dither matrixes is first read out. In addition, since the value of the counter 13c is increased by 1 after reading out the threshold value, the readout position is sequentially shifted one by one. Then, when the threshold values of a row of the M dither matrix 32 are read out (that is, when the tail threshold value of a row of the M dither matrix 32 is read output), the value of the counter 13c becomes equal to the period S (18 in the second aspect).

On the other hand, the second aspect is described with reference to FIG. 10 again. When the value of the counter 13c is equal to the period S (S336: No), the value of the counter 13c is set to 0 (S338) and the period S is added to the reference addresses of the C dither matrix 30 and the Y dither matrix 34 (all of which comprise the period L) (S340). Then, the period S is subtracted from the variable Next (S342).

Here, the second aspect is described with reference to FIG. 11B. FIG. 11B is a diagram illustrating a state right after performing the process of S324. As shown in FIG. 11B, since the reference address of the M dither matrix 32 (which comprises the period S) is not changed and the value of the counter 13c is 0, the head of a row of the M dither matrix 32 is the readout position. On the other hand, since the period S is added to the reference address of the C dither matrix 30 (which comprises the period L), the position advancing by the period S from the head threshold value of the row is a readout start position. The period S is subtracted from the variable Next. For example, since the value of the variable Next is the period L at the time of starting the two-valued line conversion process (S32), the value of the variable Next is (period L−period S) ("10" in the second aspect). The variable Next is a value indicating the update time value corresponding to the times when the counter 13c is updated, after the value of the counter 13c is initialized to "0" until the threshold values of a row are read out from the dither matrixes 30 and 34 comprising the period L. Accordingly, when the value of the counter 13c is initialized to "0" (S338) and the reference addresses of the dither matrixes 30 and 34 comprising the period L are updated, the variable Next is updated by subtracting the period S from the variable Next.

On the other hand, the second aspect is described with reference to FIG. 10 again. It is determined whether the value of the counter 13c is smaller than the variable Next (S344). When the value of the counter 13c is smaller than the variable Next (S344: Yes), the process of S328 is performed again. On the other hand, when the value of the counter 13c is equal to the variable Next (S344: No), the period L is subtracted from the reference addresses of the C dither matrix 30 and the Y dither matrix 34 (all of which comprise the period L) (S346). The period L is added to the variable Next (S348) and then the process of S328 is performed again. Then, when the two-valued conversion process has been performed to all the pixels constituting the data of a row of the input image data, the value of the variable x is equal to the number of pixels of a row of the input image data (S328: No). Accordingly, the two-valued line conversion process is ended and the process of S24 of FIG. 5 is performed again.

Next, the second aspect is described with reference to FIGS. 11C and 11D. FIG. 11C is a diagram illustrating a state right before performing the process of S346 and FIG. 11D is a diagram illustrating a state right after performing the process of S348. As shown in FIG. 11C, when the threshold values of a row of the C dither matrix 30 are read out (that is, when the tail threshold value of the row is read out) the value of the counter 13c is equal to the value of the variable Next ("10" in FIG. 11C).

When the value of the counter 13c is equal to the value of the Next as shown in FIG. 11C, the period L is subtracted from the C reference address of the C dither matrix 30 (which comprises the period L) as shown in FIG. 11D. On the other hand, the M reference address of the M dither matrix 32 (which comprises the period S) is not changed. In addition, since the value of the counter 13c is equal to the value of the Next ("10" in FIG. 11D), the position in which the tenth threshold value from the head of a row of the M dither matrix 32 is stored is the readout position. On the other hand, since the period L is subtracted from the C reference address, the position advancing by the period L from the tail of the row is the readout position in the C dither matrix 30. Accordingly, the threshold value is read out from the head of a row of the C dither matrix 30. When the threshold value is read out from the head of a row of the C dither matrix 30, the update time value corresponding to the times when the counter 13c is updated is changed until the threshold values of a row are read out from the C dither matrix 30. Accordingly, the variable Next is updated by adding the period L to the variable Next which is a value indicating the update time value of the counter 13c.

According to the second aspect, when the threshold values of a row have been read out from the dither matrixes 32 and 36 comprising the period S (that is, when the tail threshold value of the row is read out), the value of the counter 13c is returned to the initial value "0." Accordingly, the threshold values are read out from the head of a row of the dither matrixes 32 and 36 comprising the period S. Therefore, it is possible to read out the threshold values with a predetermined period from the dither matrixes 32 and 36 comprising the period S.

On the other hand, when the value of the counter 13c is returned to the initial value "0," the period S is added to the reference addresses of the dither matrixes 30 and 34 comprising the period L. As a result, the position of the "period S"-th threshold value from the head of a row of the dither matrixes 30 and 34 comprising the period L is the readout position. That is, even when the value of the counter 13c is returned to the initial value "0," the readout position of the dither matrixes comprising the period L is not returned to the head of the row (see FIG. 11B).

Accordingly, even when the counter 13c is not provided for each of the dither matrixes 32 and 36 comprising the period S and the dither matrixes 30 and 34 comprising the period L, it is possible to read out the threshold values from the dither matrixes 30, 32, 34, and 36, respectively. That is, since the counter 13c can be shared by the dither matrixes 32 and 36 comprising the period S and the dither matrixes 30 and 34 comprising the period L, the number of counters can be reduced, thereby reducing the number of processes necessary for the operation of the counters as a whole. As a result, it is possible to increase the speed of the two-valued conversion process. Specifically, when the number of pixels to be processed is large, the slight speedup of the two-valued pixel conversion process can greatly enhance the processing speed of the N-valued conversion process as a whole.

When the threshold values of a row are read out from the dither matrixes 30 and 34 comprising the period L, the period L is subtracted from the reference addresses of the dither matrixes 30 and 34 comprising the period L. Accordingly, the threshold values are read out again from the head of the dither matrixes 30 and 34. Therefore, it is possible to read out the threshold values with a predetermined period from the dither matrixes 30 and 34 comprising the period L, respectively. That is, since the counter can be shared by the dither matrixes 32 and 36 comprising the period S and the dither matrixes 30 and 34 comprising the period L, it is possible to increase the speed of the two-valued conversion process.

Since it can be determined on the basis of the value of the variable Next (update time value) and the value of the counter 13c whether the threshold values of a row have been read out from the dither matrixes 30 and 34 comprising the period L, it is not necessary to provide a particular counter for determining whether the threshold values of a row have been read out from the dither matrixes 30 and 34 comprising the period L. Accordingly, it is possible to suppress decrease in speed of the two-valued conversion process due to the increase in the number of processes necessary for controlling the counter.

When the period S is added to the reference addresses of the dither matrixes 30 and 34 comprising the period L, the period S is subtracted from the variable Next (update time value) and when the period L is subtracted from the reference addresses of the dither matrixes 30 and 34 comprising the period L, the period L is added to the variable Next (update time value). Accordingly, it is possible to calculate the update time value with a simple process. Therefore, since it is not necessary to provide a particular counter for determining whether the threshold values of a row have been read out from the dither matrixes 30 and 34 comprising the period L, it is possible to suppress decrease in speed of the two-valued conversion process.

Although the present invention has been described with reference to the aspects, the present invention is not limited to the aspects, but it is obvious to those skilled in the art that a variety of modifications can be made without departing from the gist of the invention.

For example, in the first aspect, it has been described that the numbers of threshold values constituting the rows of four kinds of dither matrixes 20, 22, 24, and 26, respectively, are equal to each other and only one counter 13c is used. However, the numbers of threshold values constituting the rows of at least two kinds of dither matrixes, respectively, may be equal to each other. In this case, since the counter can be shared with at least two kinds of dither matrixes, it is possible to enhance the processing speed of the two-valued conversion process in comparison with the case that counters are provided for the respective kinds of dither matrixes.

In the first and second aspects, the two-valued conversion process using a dither matrix is performed, but the present invention can be applied to a three-valued conversion process or a four-valued conversion process.

In the second aspect, among four kinds of dither matrixes 30, 32, 34, and 36, the numbers of threshold values constituting the rows of two dither matrixes 30 and 34, respectively, are equal to each other and the numbers of threshold values constituting the rows of two dither matrixes 30 and 34, respectively, are equal to each other. However, the numbers of threshold values constituting the rows of three dither matrixes, respectively, may be equal to each other and the number of threshold values constituting a row of the other dither matrix may be different therefrom.

According to the aspects, since the number of threshold values constituting a row of the plural kinds of dither matrixes stored in the dither matrix storage unit is the least common multiple of the number of threshold values constituting a row of the plural kinds of dither patterns, it is possible to reduce the amount of data of the plural kinds of dither matrixes as much as possible, thereby suppressing the amount of memory to be used.

According to the aspects, when the threshold values of a row have been read out from the plural kinds of dither matrixes (that is, when the tail threshold value of the row is read out), the value of the counter is returned to the initial value by the counter updating and the threshold values are read out again from the head of a row of the plural kinds of dither matrixes. Accordingly, it is possible to read out the threshold values with a predetermined period from the dither matrixes, without providing the counters for the plural kinds of dither matrixes, respectively. That is, since it is not necessary to provide the counters for the plural kinds of dither matrixes, respectively, it is possible to speed up the X-valued conversion process.

According to the aspects, the threshold values of the colors used for the N-valued converting are read out from the plural kinds of dither matrixes on the basis of the values obtained by adding the value of the counter to the reference values of the dither matrixes stored in the reference value storage unit. Accordingly, it is possible to read out the threshold values from the dither matrixes, without providing the counters for the plural kinds of dither matrixes, respectively. That is, since it is not necessary to provide the counters for the plural kinds of dither matrixes, respectively, it is possible to speed up the N-valued conversion process.

According to the aspects, when the threshold values of a row have been read out from the m dither matrix, m is subtracted from the reference value of the m dither matrix stored in the reference value storage unit. Accordingly, the threshold values are read out again from the head of the m dither matrix. Therefore, it is possible to read out the threshold values with a predetermined period from the m dither matrix. That is, since the counter can be shared by the n dither matrix and the m dither matrix, it is possible to speed up the N-valued conversion process.

According to the aspects, since it can be determined whether the threshold values of a row have been read out from the m dither matrix on the basis of the update time value stored in the update time value storage unit and the value of the counter, it is not necessary to provide a particular counter for determining whether the threshold values of a row have been read out from the m dither matrix. Accordingly, it is possible to suppress reduction in speed of the N-valued conversion process due to increase in the number of processes necessary for controlling the counter.

According to the aspects, when n is added to the reference value of the m dither matrix, n is subtracted from the update time value stored in the update time value storage unit and when m is subtracted from the reference value of the m dither matrix, m is added to the update time value stored in the update time value storage unit. Accordingly, it is possible to calculate the update time value with a simple process. Therefore, since it is not necessary to provide a particular counter for determining whether the threshold values of a row have been read out from the m dither matrix, it is possible to suppress reduction in speed of the N-valued conversion process.

What is claimed is:

1. An image processing apparatus comprising:
a N-valued conversion unit that converts color component values of plural colors comprised in pixels constituting input image data into N-valued values in a unit of color based on threshold values of plural colors;
a dither matrix storage unit that stores one of an n dither matrix in which the number of threshold values constituting a row is n (where n is an integer) and an m dither matrix in which the number of threshold values constituting a row is m (where m is an integer) in a unit of dither pattern, each dither matrix comprising such a configuration that one dither pattern or one kind of dither pattern is repeated, wherein m is greater than n;
a counter that holds a value specifying a readout position of a row of the n dither matrix and the m dither matrix stored in the dither matrix storage unit;
a reference value storage unit that stores reference values specifying the reference positions of the n dither matrix and the m dither matrix stored in the dither matrix storage unit;
a readout unit that reads out the threshold values of the colors used for the N-valued conversion unit from the n dither matrix and the m dither matrix stored in the dither matrix storage unit based on values obtained by adding the value of the counter to the reference values of the dither matrixes stored in the reference value storage unit, and the readout unit that reads out the threshold values from the head of a row of the n dither matrix when the value of the counter is an initial value;
a counter updating unit that adds a predetermined value to the value of the counter in response to reading out the threshold values from the n dither matrix and the m dither matrix by the readout unit, and counter updating unit that returns the value of the counter to the initial value in response to reading out the threshold values of a row from the n dither matrix; and
an adding unit that adds n to the reference value of the m dither matrix stored in the reference value storage unit in response to returning the value of the counter to the initial value by the counter updating unit.

2. The image processing apparatus according to claim 1, further comprising m subtracting unit that subtracts m from the reference value of the m dither matrix stored in the reference value storage unit in response to reading out the threshold values of a row from the m dither matrix by the readout unit.

3. The image processing apparatus according to claim 2, further comprising:
an update time value storage unit that stores an update time value corresponding to the number of times that the counter is updated by the counter updating unit until the threshold values of a row are read out from the m dither matrix; and
a readout determining unit that determines whether the threshold values of a row have been read out from the m dither matrix based on the update time value stored in the update time value storage unit and the value of the counter, wherein the m subtracting unit subtract m from the reference value of the m dither matrix when it is determined by the readout determining unit that the threshold values of a row have been read out from the m dither matrix.

4. The image processing apparatus according to claim 3, further comprising
an update number calculating unit that subtracts n from the update time value stored in the update time value storage unit in response to adding n to the reference value of the m dither matrix by the n adding unit, and the update number calculating unit adds m to the update time value stored in the update time value storage unit in response to subtracting m from the reference value of the m dither matrix by the m subtracting unit, wherein the counter updating unit adds "1" to the value of the counter in response to reading out the threshold values from the n dither matrix and the m dither matrix by the readout unit.

5. A computer-readable medium storing a computer program product for enabling a computer to comprise an image processing function, comprising:
software instructions for enabling the computer to perform predetermined operations
wherein, the predetermined operations comprise:
storing an n dither matrix in which number of threshold values constituting a row is n (where n is an integer) and an m dither matrix in which number of threshold values constituting a row is m (where m is an integer) in a unit of dither pattern where m is greater than n, and each dither matrix comprising such a configuration that one dither pattern or one kind of dither pattern is repeated;
storing a counter value specifying a readout position of a row of the n dither matrix and the m dither matrix in a counter;
storing reference values specifying reference positions of the n dither matrix and the m dither matrix;
converting color component values of plural colors comprised in pixels constituting input image data into N-valued values in a unit of color based on threshold values;
reading out the threshold values of the colors used for the converting from the n dither matrix and the m dither matrix stored in the dither matrix storage unit based on values obtained by adding the value of the counter to the reference values of the stored dither matrixes;
reading out the threshold values from the head of a row of the n dither matrix when the stored counter value is an initial value;
adding a predetermined value to the stored counter value in response to reading out the threshold values from the n dither matrix and the m dither matrix by the reading-out;
returning the incremented stored counter value to the initial value in response to reading out the threshold values of a row from the n dither matrix; and
adding n to the stored reference value of the m dither matrix in response to returning the stored counter value to the initial value.

6. The computer-readable medium according to claim 5, wherein the predetermined operations further comprise subtracting m from the reference value of the m dither matrix in response to reading out the threshold values of a row from the m dither matrix.

7. The computer-readable medium according to claim 6, wherein the predetermined operations further comprise:

storing an update time value corresponding to the number of times that the counter value is updated until the threshold values of a row are read out from the m dither matrix;

determining whether the threshold values of a row have been read out from the m dither matrix based on the update time value stored in the update time value storage unit and the value of the counter; and subtracting m from the reference value of the m dither matrix when the the threshold values of a row have been read out from the m dither matrix.

8. The computer-readable medium according to claim 7, wherein:

the predetermined operations further comprise:

subtracting n from the stored update time value in response to adding n to the reference value of the m dither matrix; and adding m to the stored update time value in response to subtracting m from the reference value of the m dither matrix; and adding "1" to the counter value in response to reading out the threshold values from the n dither matrix and the m dither matrix by the readout unit.

9. A computer-implemented method for an image processing comprising:

converting color component values of plural colors comprised in pixels constituting input image data into N-valued values in a unit of color based on threshold values of plural colors;

storing one of an n dither matrix in which the number of threshold values constituting a row is n (where n is an integer) and an n dither matrix in which the number of threshold values constituting a row is m (where m is an integer) in a unit of dither pattern, each dither matrix comprising such a configuration that one dither pattern or one kind of dither pattern is repeated, wherein m is greater than n;

holding a value specifying a readout position of a row of the n dither matrix and the m dither matrix;

storing reference values specifying the reference positions of the n dither matrix and the m dither matrix;

reading out the threshold values of the colors used for the N-valued conversion unit from the n dither matrix and the m dither matrix stored in the dither matrix storage unit based on the reference values of the dither matrixes;

reading out the threshold values from the head of a row of the n dither matrix when the held value is an initial value;

adding a predetermined value to the held value in response to reading out the threshold values from the n dither matrix and the m dither matrix;

returning the held value to the initial value in response to reading out the threshold values of a row; and adding n to the reference value of the m dither matrix in response to returning the held value to the initial value.

* * * * *